May 16, 1950      W. MILLER      2,507,922
BLOOD TESTING TABLE AND HOLDING DEVICE
Filed March 6, 1946
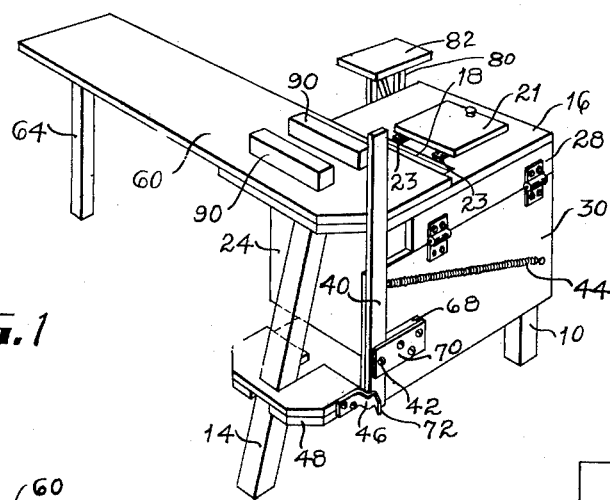
FIG. 1
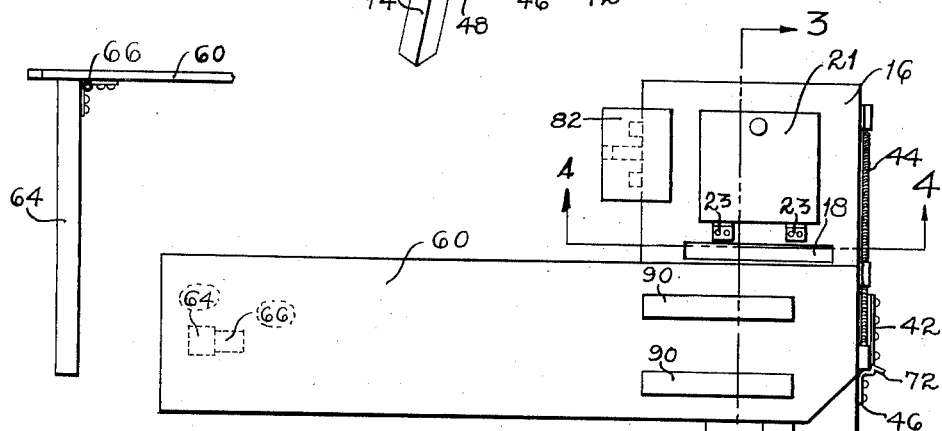
FIG. 5
FIG. 2
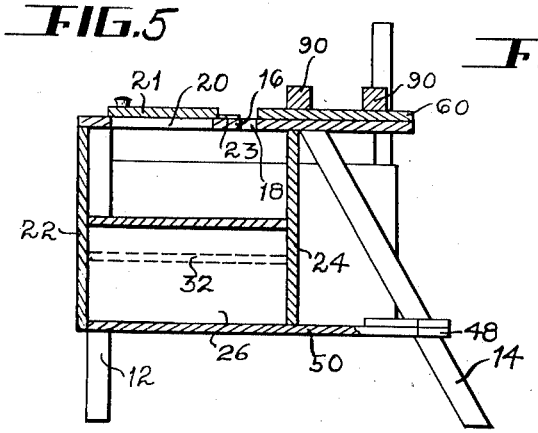
FIG. 3
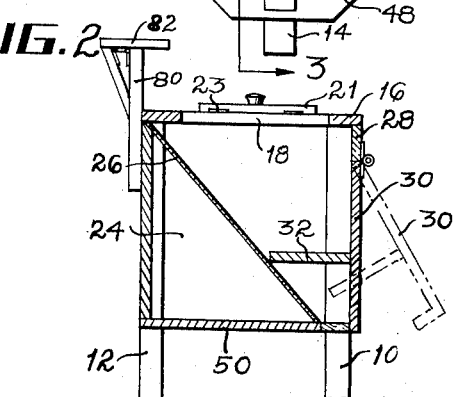
FIG. 4
INVENTOR.
WALTER MILLER
BY
*Henry G. Dybvig*
*His* ATTORNEY Patented May 16, 1950

2,507,922

UNITED STATES PATENT OFFICE 2,507,922

BLOOD TESTING TABLE AND HOLDING DEVICE

Walter Miller, Germantown, Ohio

Application March 6, 1946, Serial No. 652,412

1 Claim. (Cl. 119—97)

This invention relates to a device for temporarily confining animals and more particularly to a device that is adapted to but not necessarily limited to the confinement of poultry.

An object of this invention is to provide a device for facilitating the blood testing and otherwise culling of poultry.

Another object of this invention is to provide a compartment into which an animal may be entered from one door and released through another opening.

Another object of this invention is to provide a compartment for temporarily confining an animal wherefrom the animal may be quickly removed at the will of the operator by removing the support for the animal.

Another object of this invention is to provide a device for temporarily confining animals undergoing tests, which device is easily constructed, and light in weight, so as to lend itself to transportation from place to place. The device may have parts removed to reduce the space for storage, which device is economically produced and at the same time dependable.

Other objects and advantages reside in the construction of parts, the combination thereof and mode of operation, as will become more apparent from the following description.

Referring to the drawings:

Figure 1 is a perspective view of an animal confining device shown in readiness for use.

Figure 2 is a top plan view of the device disclosed in Figure 1.

Figure 3 is a vertical cross sectional view taken substantially on the line 3—3 of Figure 2.

Figure 4 is another vertical cross sectional view taken substantially on the line 4—4 of Figure 2.

Figure 5 is a fragmentary side elevational view of the attendant's support or seat, as viewed from the left of Figure 1.

In conducting tests upon animals for various diseases, as for example testing poultry for the pullorum disease, it is necessary to obtain a sample of the blood of each bird under test. It usually takes from 15 seconds to 2 minutes to analyze the blood, so as to determine whether or not the bird is infected. Various devices have been proposed for holding the bird, while waiting for the results. If chemicals are used that require only 15 seconds for the blood analysis, it is the customary practice to have two helpers in addition to the veterinarian or the attendant conducting the tests. One of the helpers catches the bird to hold it in readiness while the other helper holds the bird on the pedestal and holds the bird during the 15 seconds it is necessary to analyze the blood. The two helpers may alternate for the greatest efficiency. After the blood has been analyzed, the bird is either released to the flock, if the test is negative, or culled, if the test is positive. In order to eliminate one of the helpers, a compartment for confining the bird is used, which will now be described.

The device disclosed herein is supported upon a pair of vertically disposed parallel legs 10 and 12 and a diagonally disposed leg 14. These legs support a table top member 16 provided with a slot 18 and an opening 20. A suitable lid 21, held in place by suitable hinges 23, is used in closing the opening 20.

Underneath the table top 16 is located a pair of side walls 22 and 24 and a diagonally disposed wall 26. As best seen in Figure 4, a door-supporting member 28 is mounted on the under side of the table top 16 on the side opposite the diagonally disposed wall 26. Member 28 has fixedly attached thereto a door 30 provided with a trap-like ledge 32. When the door is in closed position, as shown in full lines in Figure 4, the trap-like ledge 32 forms a floor for the space between the walls 22, 24, 26 and the door 30. When the door 30 is swung to an open position by a suitable mechanism which will be described later, the ledge 32 is swung aside, so as to allow the animal confined within the compartment to escape by dropping to the ground.

A lever or handle 40, pivotally mounted at 42 to the door 30, is biased in a clockwise direction, as shown in Figure 1, by a helical spring 44. The lower end of the lever 40 normally engages a sear 46 mounted upon a ledge 48, which in reality is an extension of the floor 50. The ledge 48 is secured to the diagonally disposed leg 14, so as to provide a sturdy support for the device. By rotating the handle 40 in a counterclockwise direction, as viewed in Figure 1, the lower end of the handle 40 clears the sear 46 and the upper end clears the table top, so as to permit the handle 40 to open the door 30 into the dot-dash position shown in Figure 4.

A seat 60, mounted upon the table top 16, extends rearwardly from the device. The seat at its outer end is supported upon a leg 64 attached by a suitable hinge 66. An attendant sitting on the seat 60 is in a position to look through the slot 18 to see whether or not the bird or animal has escaped from the compartment whenever the door 30 has been opened. The attendant may also operate the lever 40, so that as soon as the bird or animal has escaped from the compartment, he may swing the handle into the vertical position again to close the door 30.

A block 68 mounted between the door 30 and the retaining plate 70 limits the movement of the handle 40 in a clockwise direction, as viewed in Figure 1, so that the handle, upon engaging the diagonally disposed portion 72 of the sear, is caught by the sear engaging the lower end of the handle whenever the door 30 is moved into closed position.

A standard 80 is attached to the side of the device. This standard supports a small platform 82 used in supporting the bird under test. The testing unit may be supported upon the blocks 90.

Mode of operation

In using the device disclosed herein, the helper catches the bird and holds it on the pedestal 80 while a specimen of the blood is drawn from the bird by the veterinarian or attendant. As soon as the blood has been drawn, the helper drops the bird through the opening 20 by opening the door 21. As soon as he drops the bird into the compartment, the door 21 is closed and the bird held in confinement. The helper then catches the second bird while the veterinarian or attendant subjects the blood to the test apparatus.

By this time the helper has another bird in readiness for the veterinarian or attendant, who obtains a specimen of the blood. He then checks the tests of the bird in the compartment to ascertain whether or not this bird shows a negative or positive reaction. If it shows a negative reaction—in good flocks more than 95% show a negative reaction—the attendant merely opens the door 30, so as to release the bird, then closes the door, so that the compartment is ready for the bird that is undergoing test. By opening the door 30 and removing the ledge or floor 32, the bird is evicted. This operation is repeated from time to time, thereby accomplishing the same result with one helper that formerly required two helpers.

Furthermore, the seat or bench 60, upon which the veterinarian or attendant is seated, increases his efficiency, in that it seems to be a very tiring procedure to stand for hours conducting tests upon hundreds of birds.

After the test of the flock has been completed, the device is carefully sterilized. Only such material is used in constructing the device that may be sterilized. The bench or seat 60 is removed, the leg 64 folded under the seat and the standard 80 either lowered or removed, so that the device may be transported in the trunk of a car, while the veterinarian or attendant travels to the next flock to be tested.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

In a portable device for use in conducting blood tests and the like on animals, said device being provided with a compartment adapted to confine an animal and having an opening in the top closed by a lid, said compartment also having a diagonally disposed wall and a pair of vertically disposed walls enclosing three sides of the compartment, the combination including a closure assembly for the compartment, said closure assembly including a door pivotally mounted on a horizontally disposed pivot, a ledge attached to the door, said ledge extending at right angles thereto and contacting the vertically disposed walls and a face of the diagonally disposed wall so as to form a floor for the compartment when the door is in closed position, said ledge swinging outwardly with the door so as to remove the ledge functioning as a floor for the compartment when the door is moved to open position, and latching means for locking the door in closed position, said latching means including a handle pivotally mounted so as to extend parallel and in contact with the outside of the door, said handle when the door is latched projecting upwardly above the compartment, said handle when actuated to open the door swinging laterally to permit movement of the door about its pivot in a direction to open the door and with it the ledge to remove the floor to thereby expel the animal held in the compartment.

WALTER MILLER.

REFERENCES CITED

The following references are of record in the file of this patent:

UNITED STATES PATENTS

| Number | Name | Date |
|---|---|---|
| 599,935 | Griffis | Mar. 1, 1898 |
| 788,015 | Bergman | Apr. 25, 1905 |
| 1,216,050 | Bass | Feb. 13, 1917 |
| 1,966,840 | Wodrich | July 17, 1934 |
| 2,392,322 | Hill | Jan. 8, 1946 |